April 7, 1925.  1,533,053
R. E. WILSON
METHOD AND APPARATUS FOR REMOVING VOLATILE FLUIDS FROM SOLIDS
AND SUBSTANTIALLY NONVOLATILE LIQUIDS
Filed July 22, 1922
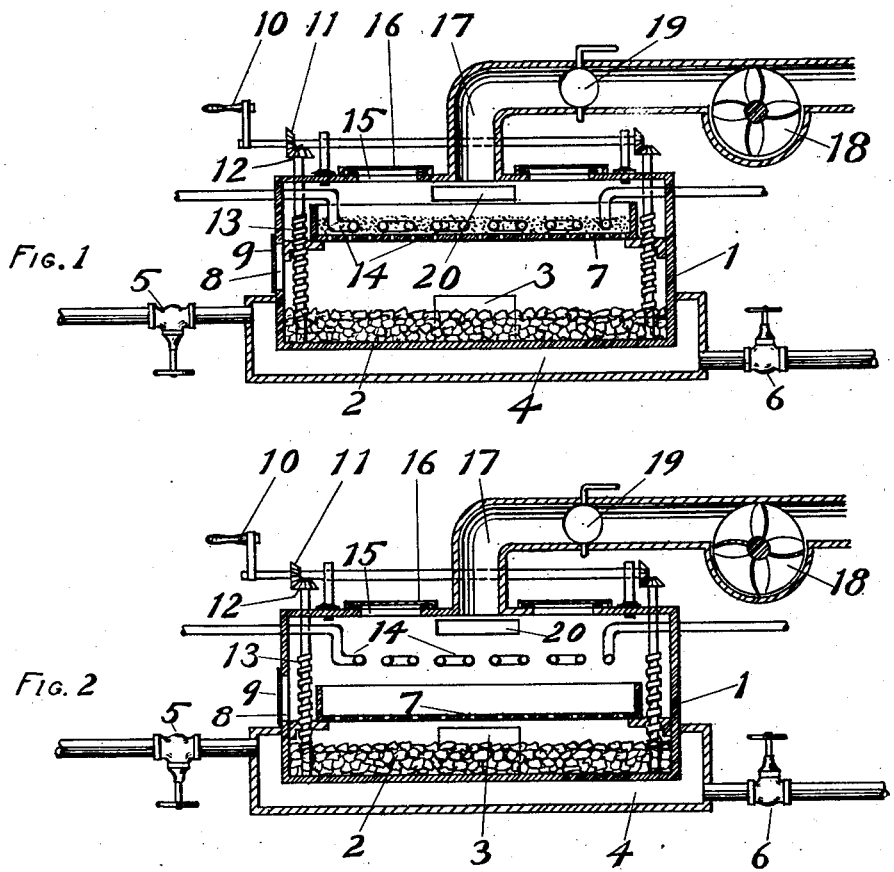
Robert E. Wilson
INVENTOR.

Patented Apr. 7, 1925.

1,533,053

UNITED STATES PATENT OFFICE.

ROBERT E. WILSON, OF CAMBRIDGE, MASSACHUSETTS, ASSIGNOR TO BALTIMORE GAS ENGINEERING CORPORATION, OF BALTIMORE, MARYLAND, A CORPORATION OF MARYLAND.

METHOD AND APPARATUS FOR REMOVING VOLATILE FLUIDS FROM SOLIDS AND SUBSTANTIALLY NONVOLATILE LIQUIDS.

Application filed July 22, 1922. Serial No. 576,847.

*To all whom it may concern:*

Be it known that I, ROBERT E WILSON, a citizen of the United States, residing at Cambridge, in the county of Middlesex and State of Massachusetts, have invented certain new and useful Improvements in Methods and Apparatus for Removing Volatile Fluids from Solids and Substantially Nonvolatile Liquids, of which the following is a specification.

This application is a continuation in part of application Serial No. 302,888, filed June 9, 1919.

This invention relates to the removal of volatile fluids such as gases, gaseous materials, vapors and liquids from solids or substantially non-volatile liquids.

Among the objects of this invention is the provision of a process and apparatus whereby the removal of condensible volatile fluids from solids and substantially non-volatile liquids is accomplished in a simple, convenient, cheap and highly efficient manner.

In carrying out the objects of this invention, there are provided a process and apparatus whereby sorbents, such as are commonly employed in gas mask canisters for removal of poisonous gases or fumes from air for breathing, are brought in close proximity to the material from which the volatile fluids are to be removed and under conditions designed to assist the passage of the volatile fluid from the material to the sorbents.

Previously, such removal and recovery have almost invariably been carried out by means of non-volatile solvents in which the volatile constituent to be removed was dissolved and then extracted by distillation or similar processes. Such procedure has many disadvantages. The use of a solvent requires a large surface exposure for a long time and the absorption of the fluid to be removed is usually incomplete. The recovery of the solvent is dependent upon the change of vapor pressure of the volatile liquid in the solvent with changes of temperature. Usually, only part of the material dissolved in the solvent can be recovered; especially, where the boiling points of the two are not widely separated. The capacity of the solvent up to saturation is usually comparatively low; not over 5 to 10%.

This invention obviates practically all of these difficulties. The process may be very rapid in operation and yet a substantially complete recovery of the fluid may be obtained without difficulty. The material employed for the recovery of the fluid is compartively cheap, almost completely recoverable and the process may be applied to cases where the use of a solvent is entirely impractical. The process is adapted to a variety of uses; for instance, in the removal of solvents such as gasoline used in making sheet rubber goods, acetone and other volatile solvents used in smokeless powders and pyroxylin manufacture and for the recovery of many other similar solvents used in a wide variety of industries. This invention also includes the removal of water, where solvent recovery is not desired, but carefully regulated humidity conditions are needed, as in the desiccation of food stuffs.

Among the solid sorbing agents available for this process, charcoal, preferably the activated variety, ferric hydroxide gel and silica gel are named as specific examples, but it is to be understood that this invention is not to be limited to these specific examples because other solids having high sorptive properties may be used in lieu of the specific substances named. These solid sorbing agents, which preferably are in the form of porous granules, (although in some instances powdered material may be used), easily and quickly sorb large quantities of various fluids and thus may be used for the extraction of various volatile constituents wherever it may be desirable to do so.

These solid sorbents are more efficient than liquid solvents for the recovery of volatile fluids because sorption by an active solid is much more rapid than solution in a liquid and also because sorbing agents hold relatively large amounts of vapor which exert practically no vapor pressure. The amount of condensed vapor which can be held by a certain weight of these solid sorbents is in general very much greater than that which can be held by an equal weight of liquid, some sorbents being capable of holding as much as their own weight of certain condensed vapors. In the case of liquid recovery agents, it is often difficult to find one which absorbs a large proportion of vapors, whereas the solid sorbing agents hold very large amounts of most of the easily condensible vapors. It is possible to recover practically completely the vapors held by such solid sorbing agents by heating to about 100° C. above the boiling point of the fluid recovered, whereas such temperatures would make possible the recovery of but a fraction of the vapors held by recovery liquids. It is also easier to bring air or gases into intimate contact with a solid sorbent than with a liquid solvent.

This invention also contemplates the employment of a mixture of two or more solid sorbing materials.

A specific example of an apparatus suitable for carrying out this invention is shown in the accompanying drawings.

Figure I is a vertical section illustrating a preferred form of apparatus and showing the carrier or holder for the sorbent material in one position. Figure II is a similar view showing the holder or carrier for the sorbent in another position.

The apparatus comprises a chamber (1) at the bottom of which is placed the material (2) from which the volatile fluid is to be extracted. This material is shown as of solid pieces, but it is to be understood that this invention also contemplates the removal of volatile fluids from substantially or relatively non-volatile liquids. This material (2) may be introduced through any suitable entrance, such as the door (3), and if liquids are to be treated, a convenient opening for the introduction thereof is provided. A heating jacket (4) is provided, the necessary heating fluids, such as hot water or steam, entering through the valve (5) and leaving through the valve (6).

A tray (7), having a bottom of perforated or reticulated material is introduced into the chamber (1) through the opening (8), which is closed by a suitable door (9), the tray assuming the position shown in Figure II. This tray is then raised to the position shown in Figure I, by suitable mechanism, such as the handle (10), gears (11) and (12) and screws (13). When in the latter position, coil (14) will be positioned within the tray (7). The top of the chamber (1) is provided with openings (15) and covers (16). Through these openings, the sorbent material is introduced and drops into the tray (7), and when the tray is in the position shown in Figure I, this material will cover the coil (14), which will thus become embedded in the sorbent material. Within the coil is circulated some cooling means, such as cold air, cold water or chilled brine, and this serves to cool the sorbent within the tray (7). The outlet pipe (17) communicates with the chamber (1) through the top of the chamber and leads to the vacuum or exhaust pump (18), thus affording communication between the vacuum apparatus and the interior of the chamber (1). This communication between the pump (18) and the chamber (1) may be cut off by means of a suitable valve (19).

In operating this device, after the material from which the volatile fluid is to be removed has been supplied to the bottom of the chamber (1), the tray (7) is introduced into the chamber (1) and then brought to the position shown in Figure I. Sorbent material is then introduced through the opening (15) and covers or completely imbeds the cooling coil (14). If there is any tendency for the sorbent material to form into mounds, the material may be levelled by suitable means; for example, a rake introduced through the opening (20). The sorbent material may either be cooled before introduction into the chamber (1), or, if desired, the cooling coil (14) may be depended upon entirely for maintaining the desired temperature.

In carrying out this process, the doors (3) and (9) and covers (16) are closed. The chamber (1) is then evacuated either by means of the pump (18) or else the air is driven out from the chamber by heating the material (2). The chamber is then closed by shutting the valve (19). The condensible fluid, which has been evolved, is taken up by the sorbent in the tray (7) and this causes an additional amount of volatile fluid to be evolved from the material (2), in order to adjust the pressure within the chamber. This phenomenon of the evolution of the volatile fluid from the material (2) and the sorption thereof by the material in the tray (7) continues until the sorbent has taken up its capacity of condensible fluid, when equilibrium will be established in the system.

The sorbent, which now carries the volatile fluid, is then placed in a suitable retort (not shown) and the volatile fluid removed therefrom by either heat or vacuum or a combination of heat and vacuum. The spent material, from which the volatile fluid has been drawn, may be removed from the bottom of the chamber (1) and utilized for such purposes as desired.

In general, where sorption of volatile fluids by solids is effected, the operation takes place with evolution of heat which raises the temperature of the sorbent material and, in some instances, this heating is considerable. Since the sorbent capacity of the sorbent decreases greatly with the rise in temperature, it is desirable to have the temperature of the sorbing agent as low as possible. This is accomplished by the methods herein described.

Similarly, the vaporization of the volatile solvents, from a solid or substantially non-volatile liquid containing same, is accompanied by a cooling effect which tends to slow down the rate of vaporization. In order to counteract this effect, the material, from which the fluid is to be evolved, may be heated by means of the heating jacket (4).

The process herein described may be clearly distinguished from prior processes of this character in that this invention involves the sorption of relatively large amounts of fluid and their subsequent recovery.

By the terms "sorb", "sorbing", "sorption" and "sorbent", it is intended to include the phenomena of adsorption, absorption or a combination of both adsorption and absorption.

This invention is not limited to the specific details set forth in the foregoing examples which should be construed as illustrative and not by way of limitation, and, in view of the numerous modifications which may be effected therein without departing from the spirit and scope of this invention, it is desired that only such limitations be imposed as are indicated in the appended claims.

I claim as my invention:

1. In a process of removing volatile fluids from solids and substantially non-volatile liquids containing same, placing the material carrying the volatile fluid in a closed chamber in close proximity to but out of contact with a solid having high sorptive power for the volatile fluid and accelerating the transfer of the volatile fluid from said material to the sorbing solid by removing a large proportion of the air in said chamber.

2. In a process of removing volatile fluids from solids containing same, placing the solid carrying the volatile fluid in a closed chamber in close proximity to but out of contact with another solid in granular form and having high sorptive power for the volatile fluid and accelerating the transfer of the volatile fluid from the first named solid to the second named solid by removing a large proportion of the air in said chamber.

3. In a process of removing volatile fluids from solids containing same, placing the solid carrying the volatile fluid in a closed chamber in close proximity to but out of contact with another solid having high sorptive power for the volatile fluid and accelerating the transfer of the volatile fluid from the first named solid to the second named solid by heating the first named solid and removing a large proportion of the air in said chamber.

4. In a process of removing volatile fluids from solids and substantially non-volatile liquids containing same, placing the material carrying the volatile fluid in a closed chamber in close proximity to but out of contact with a solid of granular form and having high sorptive power for the volatile fluid and accelerating the transfer of the volatile fluid from said material to the sorbing solid by heating said material and removing a large proportion of the air in said chamber.

5. In a process of removing volatile fluids from solids and substantially non-volatile liquids containing same, effecting a transfer of the volatile fluid therein to a solid having high sorptive power for said volatile fluid by bringing the sorbent in close proximity thereto but out of contact therewith and cooling the sorbing solid during its sorption of the volatile fluid.

6. In a process of removing volatile fluids from solids containing same, effecting a transfer of the volatile fluid to another solid in granular form and having high sorptive power for said volatile fluid by bringing said solids in close proximity to but out of contact with each other and cooling the solid having high sorptive power during its sorption of the volatile fluid.

7. In a process of removing volatile fluids from solids and substantially non-volatile liquids containing same, placing the material carrying the volatile fluid in a closed chamber in close proximity to but out of contact with a solid having high sorptive powers for the volatile fluid, evacuating said chamber, then allowing the transfer of the volatile fluid from said material to the sorbing solid and cooling the sorbing solid during its sorption of the volatile fluid.

8. In a process of removing volatile fluids from solids and substantially non-volatile liquids containing same, placing the material carrying the volatile fluid in a closed chamber in close proximity to but out of contact with a solid having high sorptive power for the volatile fluid and accelerating the transfer of the volatile fluid from said material to the sorbing solid by removing a large proportion of the air in said chamber and cooling the sorbing solid during its sorption of the volatile fluid.

9. In a process of removing volatile fluids from solids and substantially non-volatile liquids containing same, placing the material carrying the volatile fluid in a closed chamber in close proximity to but out of contact with a solid in granular form and having high sorptive power for the volatile fluid and accelerating the transfer of the volatile fluid from said material to the sorbing solid by evacuating said chamber and cooling the sorbing solid during its sorption of the volatile fluid.

10. In a process of removing volatile fluids from solids containing same, placing the solid carrying the volatile fluid in a closed chamber in close proximity to but out of control with another solid having high sorptive power for the volatile fluid and accelerating the transfer of the volatile fluid from the first named solid to the second named solid by removing a large proportion of the air in said chamber and cooling the sorbing solid during its sorption of the volatile fluid.

11. In a process of removing volatile fluids from solids and substantially non-volatile liquids containing same, effecting a transfer of the volatile fluid therein to a solid having high sorptive power for said volatile fluid by bringing the sorbent in close proximity to but out of contact with the first named material and heating the solid carrying the volatile fluid.

12. In a process of removing volatile fluids from solids containing same, effecting a transfer of the volatile fluid therein to another solid in granular form and having high sorptive power for said volatile fluid by bringing said solids in close proximity to but out of contact with each other and heating the solid carrying the volatile fluid.

13. In a process of removing volatile fluids from solids and substantially non-volatile liquids containing same, placing the material carrying the volatile fluid in a closed chamber in close proximity to but out of contact with a solid having high sorptive power for the volatile fluid and accelerating the transfer of the volatile fluid from said material to the sorbing solid by removing a large proportion of the air in said chamber and heating the material carrying the volatile fluid.

14. In a process of removing volatile fluids from solids and substantially non-volatile liquids containing same, effecting a transfer of the volatile fluid therein to a solid having high sorptive power for said volatile fluid by bringing the sorbent in close proximity thereto but out of contact therewith, heating the material carrying the volatile fluid and cooling the sorbing solid during its sorption of the volatile fluid.

15. In a process of removing volatile fluids from solids and substantially non-volatile liquids containing same, placing the material carrying the volatile fluid in a closed chamber in close proximity to but out of contact with a solid having high sorptive power for the volatile fluid and accelerating the transfer of the volatile fluid from said material to the sorbing solid by evacuating said chamber, heating the material carrying the volatile fluid and cooling the sorbing solid during its sorption of the volatile fluid.

16. In a process of removing volatile fluids from solids and substantially non-volatile liquids containing same, placing the material carrying the volatile fluid in a closed chamber in close proximity to but out of contact with a solid having high sorptive power for the volatile fluid and accelerating the transfer of the volatile fluid from said material to the sorbing solid by removing a large proportion of the air in said chamber, heating the material carrying the volatile fluid and cooling the sorbing solid during its sorption of the volatile fluid.

17. In an apparatus for removing volatile fluids from solids and substantially non-volatile liquids containing same, a closed vessel, sorbent material contained within said vessel, means for evacuating said vessel and means for cooling sorbent material within said vessel.

18. In an apparatus for removing volatile fluids from solids and substantially non-volatile liquids containing same, a closed vessel, sorbent material contained within said vessel, means for evacuating said vessel, means for heating the material from which the volatile fluid is to be removed, means for evacuating said vessel and means for cooling sorbent material within said vessel.

19. In an apparatus for removing volatile fluids from solids and substantially non-volatile liquids containing same, a closed vessel, sorbent material contained within said vessel, means for evacuating said vessel and means, comprising a coil adapted to expose large surface contact to the sorbent material, for cooling same.

20. In an apparatus for removing volatile fluids from solids and substantially non-volatile liquids containing same, a closed vessel, sorbent material contained within said vessel, means for evacuating said vessel, means for heating the material from which the volatile fluid is to be removed and means, comprising a coil adapted to expose large surface contact to the sorbent material, for cooling same.

21. In an apparatus for removing volatile fluids from solids and substantially non-volatile liquids containing same, a closed vessel, sorbent material contained within said vessel, cooling means within said vessel and means for positioning the sorbent material among the cooling means.

22. In an apparatus for removing volatile fluids from solids and substantially non-volatile liquids containing same, a closed vessel, means for heating the lower part of said vessel, cooling means disposed in the upper part of said vessel, a tray containing sorbent material means for receiving and supporting said tray below said cooling means and means for bringing said tray in close proximity to said cooling means for the purpose of cooling the sorbent material contained in said tray.

23. In an apparatus for removing volatile fluids from solids and substantially nonvolatile liquids containing same, a closed vessel, means for heating the lower part of said vessel, cooling means disposed in the upper part of said vessel, a tray containing sorbent material means for receiving and supporting said tray below said cooling means, means for bringing said tray in close proximity to said cooling means for the purpose of cooling the sorbent material contained in said tray, and means for evacuating said vessel.

In testimony whereof I hereby affix my signature.

ROBERT E. WILSON.